(12) United States Patent
Munson, Jr.

(10) Patent No.: US 9,120,384 B2
(45) Date of Patent: Sep. 1, 2015

(54) NANO-ENERGETIC ACTIVATED STEAM GENERATOR

(75) Inventor: David Murray Munson, Jr., Dallas, TX (US)

(73) Assignee: FOI Group, LLC, Dallas, TX (US)

(*) Notice: Subject to any disclaimer, the term of this patent is extended or adjusted under 35 U.S.C. 154(b) by 441 days.

(21) Appl. No.: 13/261,417

(22) PCT Filed: Mar. 2, 2011

(86) PCT No.: PCT/US2011/026893
§ 371 (c)(1),
(2), (4) Date: Aug. 31, 2012

(87) PCT Pub. No.: WO2011/109538
PCT Pub. Date: Sep. 9, 2011

(65) Prior Publication Data
US 2013/0014710 A1    Jan. 17, 2013

Related U.S. Application Data

(60) Provisional application No. 61/339,252, filed on Mar. 2, 2010.

(51) Int. Cl.
*F22B 29/00* (2006.01)
*F22B 31/00* (2006.01)
*B60L 1/02* (2006.01)

(52) U.S. Cl.
CPC .................................. *B60L 1/02* (2013.01)

(58) Field of Classification Search
CPC .......... F01K 3/188; F22B 1/08; F22B 37/322; F22B 37/303; A47J 36/28
USPC ........................ 204/157.41; 122/367.4, 367.1
See application file for complete search history.

(56) References Cited

U.S. PATENT DOCUMENTS

| 4,200,438 A | * | 4/1980 | Kaimann et al. | 48/73 |
| 4,251,228 A | * | 2/1981 | Muenger et al. | 48/197 R |
| 5,226,936 A | * | 7/1993 | Garkawe | 55/434.4 |

(Continued)

OTHER PUBLICATIONS

International Searching Authority: Notification of Transmittal of International Search Report, Written Opinion of Int'l Searching Authority, or the Declaration dated Jun. 10, 2011.

(Continued)

*Primary Examiner* — Steven B McAllister
*Assistant Examiner* — Rabeeul Zuberi
(74) *Attorney, Agent, or Firm* — D. Scott Hemingway; Hemingway & Hansen, LLP

(57) ABSTRACT

A method and system for generating high pressure superheated steam on demand that uses nano-sized aluminum particles to allow oxidation and heat generation using photonic initiation. This invention uses the unique properties of nano-sized aluminum either alone or with other energetics to provide the needed heat to quickly vaporize and superheat water directly in either a flowing water or static water environment to produce steam as needed. Due to its compact design it can be used in new or existing steam applications. This steam use may be any application that needs an on demand high pressure steam supply. Applications include steam catapults, boost steam for turbines, steam cleaners, surge power for powerplant turbines and any other use.

23 Claims, 4 Drawing Sheets

(56) References Cited

U.S. PATENT DOCUMENTS

| | | | |
|---|---|---|---|
| 5,466,270 A | 11/1995 | Abdelmalek | |
| 7,665,985 B1 | 2/2010 | Chehroudi et al. | |
| 2009/0044887 A1* | 2/2009 | Adiga | 149/109.4 |
| 2009/0238708 A1* | 9/2009 | Go | 418/164 |

OTHER PUBLICATIONS

International Searching Authority: International Search Report dated Jun. 10, 2011.
International Searching Authority: Written Opinion of the International Searching Authority dated Jun. 10, 2011.

* cited by examiner

US 9,120,384 B2

NANO-ENERGETIC ACTIVATED STEAM GENERATOR

RELATED APPLICATION DATA

This application is related to Provisional Patent Application Ser. No. 61/339,252 filed on Mar. 2, 2010, and priority is claimed for this earlier filing under 35 U.S.C. §119(e). The Provisional Patent Application is also incorporated by reference into this patent application.

TECHNICAL FIELD OF THE INVENTION

A steam generator cycle heat uses nano-energetic particles as heat source.

BACKGROUND AND PRIOR ART OF THE INVENTION

The safe generation of steam was the driving force for the formation of the American Society of Mechanical Engineers. Many different designs and methods exist for the production of steam. The primary method involves the use of an external heat source providing heat through a boiler wall to water and or steam to vaporize the water and possibly superheat the produced steam.

This method is in wide use with a variety of heat sources including, oil, natural gas, coal, biomass, nuclear and solar energy as heat sources. External heating provides separation of heating from the water/steam but is limited by the thermal and mechanical properties of the boiler walls. Such boilers have lengthy startup periods and an inability to adjust to short term transient events.

Some boilers have been devised to use chemical heat reactions within the boiler to provide additional energy to assist with the generation of steam. Typically reactants such as Magnesium oxide and other similar materials can react with already heated steam to provide additional energy.

The maximum efficiency of a process using steam can be modeled using the Carnot cycle, but maximum efficiency is never reached due to pumping friction losses and heat transfer losses of the boiler and other heat exchangers. An improved new method of rapid generation of high pressure steam would allow steam to be produced to meet our difficult and growing power needs.

SUMMARY OF THE INVENTION

The steam generator cycle of the present invention uses discrete packets of a mixture of nano-particle sized aluminum particles, a source of oxygen and other optional oxidizable fuels to directly heat the water-packet mixture. Two fundamentally different methods can be used with the present invention. The first method uses a pump to provide pressurized water to a mixing chamber to generate larger quantities of steam, and the second method uses a fixed volume of water and energetic packets in a container which becomes pressurized as steam is generated.

DETAILED DESCRIPTION OF THE PREFERRED EMBODIMENT

The pumped process begins with water being pressurized to the desired steam pressure and delivered to a packet metering device where a desired number of packets are inserted into the water stream. When steam production is needed, a high intensity light source such as a strobe, laser or other suitable light shines on the water and packet mixture sufficiently to initiate oxidation of the nano-sized aluminum particles through the optically clear outer packet lining.

As the nano-aluminum oxidizes it initiates the other materials in the packet and directly heats the surrounding water as the mixture flows towards the steam use point. If the steam use requires clean dry steam the boiling water mixture can travel through a cyclonic steam separator to separate the steam from the aluminum oxide particles and other combustion byproducts. As the heat source is mixed with the water, heat transfer is unimpeded and the water can quickly be converted to superheated steam in a very short travel distance. The production of supercritical steam offers great efficiency to power many processes.

The use of nano-sized aluminum particles to initiate oxidation allows the process to be initiated by means of a high intensity light burst without physical contact between the light source and the nano-particle. Particles smaller than the wavelength of light can absorb light energy but are unable to reradiate it, causing the light energy to remain inside the particle.

Because these particles have enormous surface area relative to their mass, the heating is sufficient to melt the particle. This allows a passivated aluminum particle to expose pure aluminum to its environment and rapidly oxidize when any oxygen is present, regardless of whether it is free oxygen or bound to hydrogen. The heat energy released by the nano-sized aluminum can be used to further initiate oxidation in larger close proximity aluminum particles and or other fuels. These reactions generate light energy that will set of other packets within a short distance in line of sight through water or air. Using small packets located inside the water to be converted allows very rapid heating, and boiling of the water and possible superheating of the produced steam to occur at the point of desired use. The choice of a fixed water volume steam generator or the pressurized water inline steam generator is tied to the intended use of the discharged steam mixture.

Figure 1:
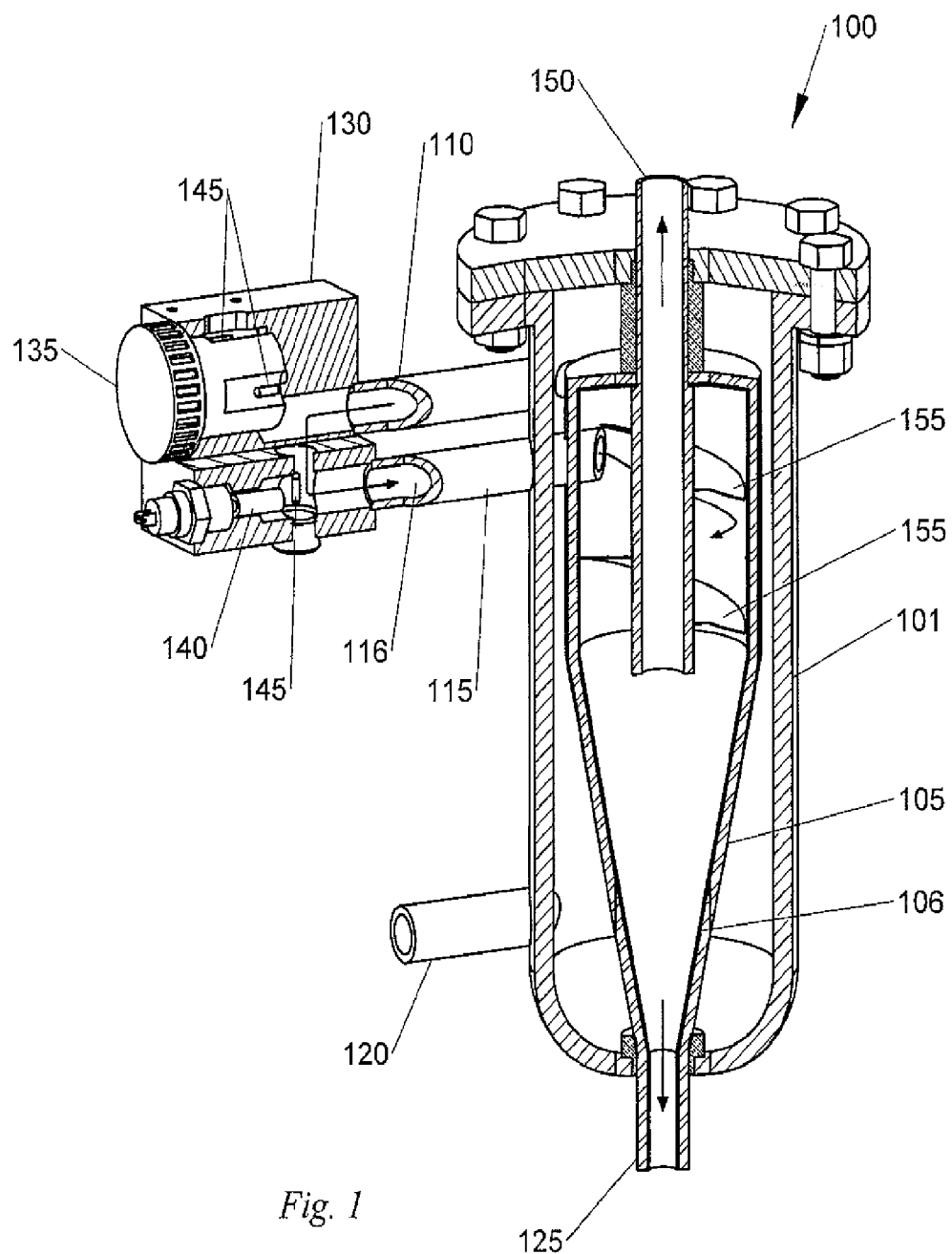
FIG. 1 shows a prospective view of the steam generator practicing the claimed invention.

FIG. 1 shows a pressurized water feed steam generator 100 with cyclonic steam separator/superheat chamber 105. To safely contain very high pressures of superheated steam, it is desirable to use small internal diameter vessels. Furthermore as the properties of steel are diminished or exceeded at continuous elevated temperatures, the steam separator/superheater chamber 105 has an insulating ceramic liner 106 to keep the high heat of the discharge steam exiting from discharge pipe 150 away from the pressure bearing outer vessel wall 101. Pressurized water flows in through inlet pipe 120 and enters the pre-heat chamber 107 between wall 101 and cyclone wall 105 to absorb any heat traveling thru the insulating ceramic liner 106 and outer wall of the cyclone 105.

The preheated pressurized water now leaves pre-heat chamber 107 and travels through transfer pipe 110 to the energetic packet metering assembly 130. Additional heat exchange and cooling of system components may be done by the pressurized water before and after it enters metering assembly 130 to increase cycle efficiency and material durability. Inside metering assembly 130 a pressure balanced rotary metering hub 135 places the energetic packets 145 into the water stream at the desired rate to produce the steam needed. The water and energetic packet mixture travels past the controlled high intensity light source 140 which provides the light energy to initiate oxidation of the energetic particles as they travel through tube 115.

Tube 115 is designed with a reflective inner coating 116 to ensure complete initiation and prevent absorption of the generated thermal energy as the initiated packet 145 travels through tube 115 and enters the cyclone 105 in a tangential trajectory. The discharge from tube 115 is guided downward by helical internal vanes 155 as the mixture oxidizes and superheated steam is produced. The velocity of the water increases as it heats and begins to convert to steam.

This rapid increase in velocity and the centrifugal forces created by the circular motion of the cyclone increases the separation of the mixture keeping the heavier oxidizing particles and water toward the cyclone wall and causing the produced steam to move to the center of the cyclone 105. The clean superheated steam travels inward and exits up steam delivery pipe 150 to the desired use. The heavier oxidation byproducts and unboiled water continue to be forced outward and downward in a decreasing, spiraling radius until exiting the cyclone discharge pipe 125.

Cyclone 105 can be made of an abrasion resistant ceramic that does not need to withstand high steam pressures because of the pressure balance between the supply water on the outside of the cyclone 105 and the steam mixture on the inside. The aluminum oxide and any other solids are separated from the steam exiting pipe 150 and can be removed either with some steam or without through a solids discharge pipe 125.

This steam generator offers capabilities that have been largely unavailable previously and can be configured in many variations to meet a wide variety of applications. The configuration of FIG. 1 is intended to generate superheated clean steam suitable for providing high power output on very short notice to power such devices as high force long travel catapults for aircraft, a rocket or projectile launch, rail gun electric power generators, laser power generators or other power applications. The use of pressurized feed water allows the steam generator 100 to operate for long periods of time without heating the pressure vessel walls 101, substantially even when producing very high temperature steam.

The steam generator 100 of FIG. 1 can be designed without the separation cyclone 105 to provide a steam and aluminum oxide discharge for cleaning and cutting purposes. Very high pressure and temperature discharge can be produced providing unprecedented erosive cutting ability with the addition of a higher concentration of energetic packets 145. In some applications compressed air or oxygen can be used instead of water to produce even higher temperatures when desired.

Figure 2:
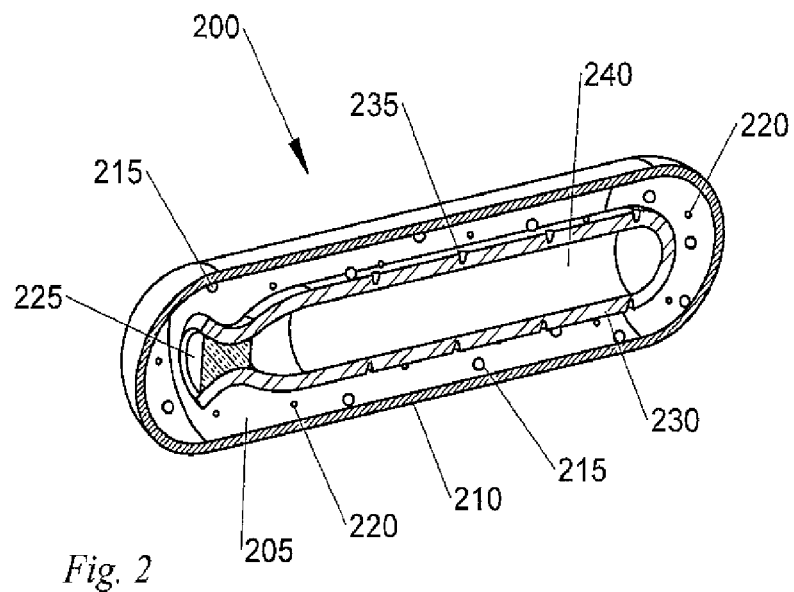
FIGS. 2 and 2A show cut-away view of the energetic nano-particle capsule.
Figure 2A:
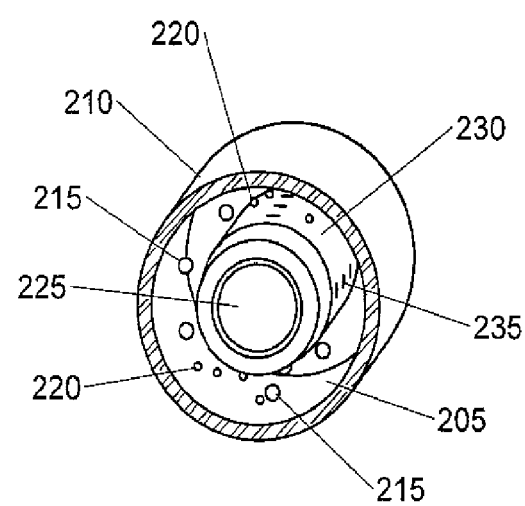

FIG. 2 and FIG. 2A is a cut-away of an energetic packet. The clear outer casing 210 holds the mixture 205 of nano Al particles 220 in a water or water hydrogen peroxide slurry mixture 205. Suspended in the mixture 205 can be additional fuels such as larger aluminum particles 215, and other fuels. A thin filmed sealed aluminum capsule 230 can be used that may have nano Al initiators 235 along its length, to ignite it and the hydrocarbon and oxygen mixture 240 that is contained inside. One end of the aluminum capsule 230 can have a combustible plug 225 that has a dual purpose to seal the opening and facilitate the filling of capsule 230 with mixture 240.

The combustible plug 225 can be designed to burn more quickly than the initiators 235 or instead of them in applications where it is desired to have capsule 230 move out of the initial combustion area before it is completely oxidized. Many different capsule 230 configurations can be used with different mixtures 240 and designs to meet usage goals. Capsules such as 230 offer a longer burn time in larger engines such as might be used in a lighter than air vessel, which operates at a low airspeed, or during high power operations. The use of different composition packets 200 to meet the needed power level allows very rapid thrust changes.

It will be understood that this example energetic packet does not restrict the variations that are needed to fully implement the advantages of this fuel delivery system component of the invention. Furthermore in some below freezing applications the use of frozen water and nano Al as an outer casing may offer advantages in high altitude aircraft where packets may be fabricated as used with differing compositions. Likewise an outer casing 210 may have a similar design to capsule 230 with an oxidizable metallic shell.

Figure 3:
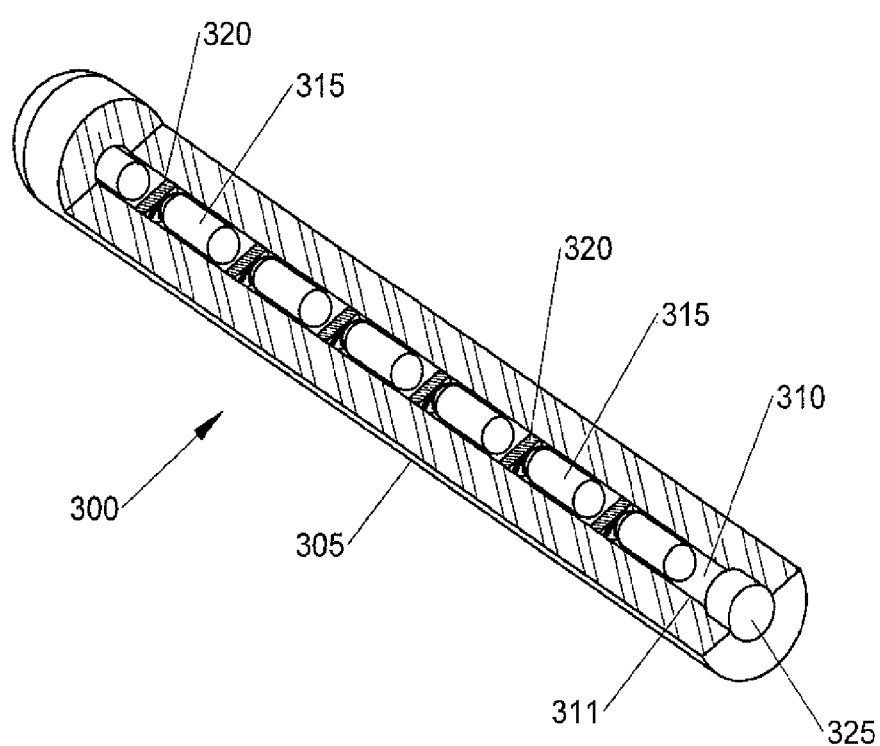
FIG. 3 shows a fixed water short duration generator.

FIG. 3 shows a cutaway of a fixed water short duration steam generator. Canister 300 is a short duration steam burst generator capable of generating high pressure superheated steam discharge rapidly. Outer housing 305 is constructed of material capable of handling the desired pressure safely such as steel, composite materials, or other metals. The inner bore 310 can be lined with a reflective coating 311 or finish to prevent the produced heat from transferring through the outer housing 305 during the steam production phase.

Energetic Fuel Packets 315 are of a formulation as discussed in FIG. 2. The space between the inner bore 310 walls and the EFP 315 can be filled with water to use the heat released by the EFP 315. In cases where a slightly longer duration of steam production is needed and to slow the rate of EFP packet initiation, a combustible separator plug 320 can be used. This CSP 320 serves to provide a very short break between EFP 315 initiations that allows the produced steam to travel out thru the opening initially blocked by clear entrance plug 325.

CEP 325 serves to keep the water in the vessel during storage, transport and prior to steam generation. CEP 325 is designed to break open at a desired pressure to allow the steam to travel to its desired location of use. Many different canister configurations are possible to meet the need to high pressure superheated steam in both existing technology and new inventions made possible by this invention. CSP 325 can be designed so that it not only controls the reaction rate of multiple EFPs 315 in sequential fire but also provides some superheat to the steam that flows thru it. Canister 300 can use only one EFP 315 or multiple as dictated by the use. The steam exhaust can also be cleaned using a cyclonic separator (not shown) such as seen in FIG. 1.

These steam generators offer a great improvement over existing boiler technology to produce very high temperature and pressure superheated steam quickly and efficiently. This will allow a new generation of efficient steam cycle power plants and uses. These include vehicle power, steam catapults, steam cleaners, abrasive cutters, weapons, and other yet to be conceived uses.

Figure 4:
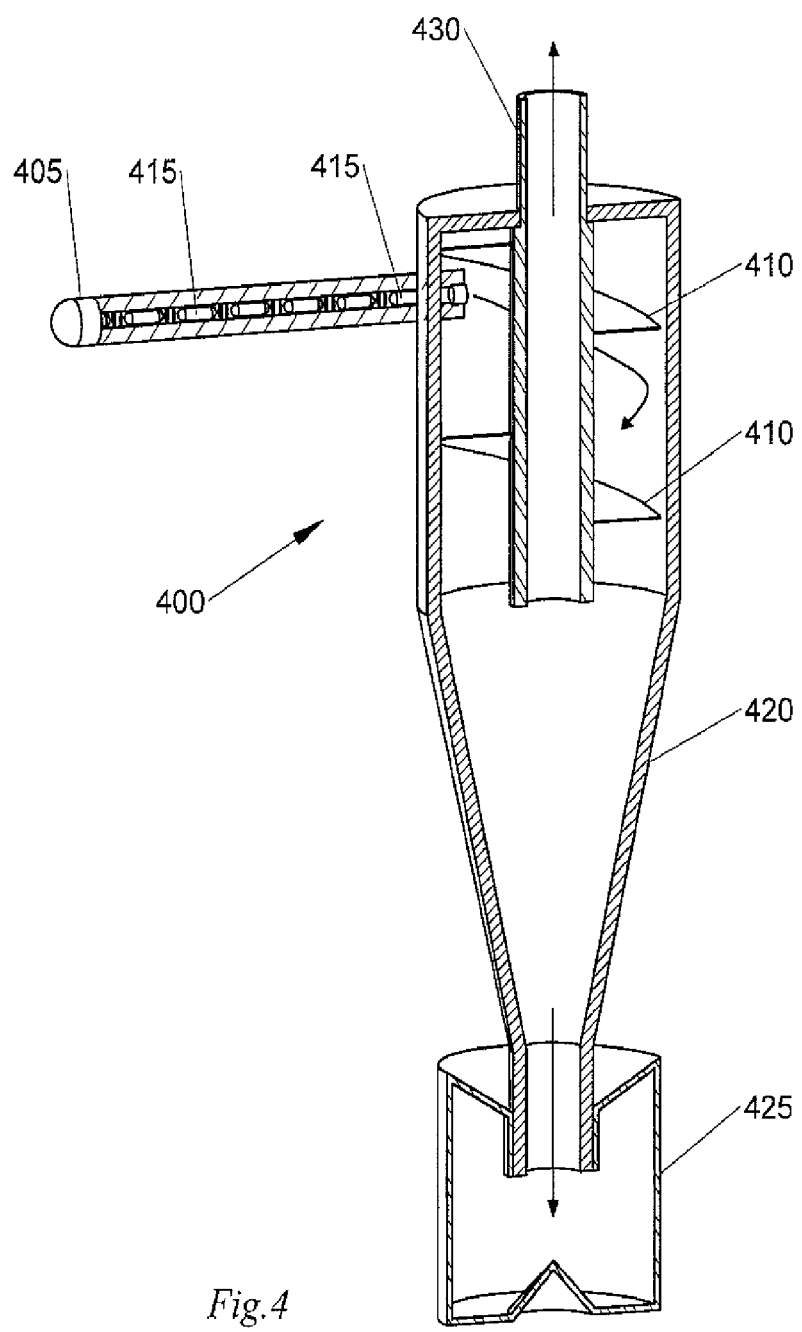
FIG. 4 shows a prospective view of the steam generator practicing the claimed invention.

FIG. 4 is a short duration steam generator that uses the steam canister 300 as disclosed in FIG. 3 is shown attached to a cyclonic Steam separator assembly 400. In FIG. 400 the energetic packets 415 are sequentially initiated producing a high pressure steam, particle and water discharge tangential to the interior wall of conical cyclone vessel 420. The discharge is guided downward by helical internal vanes 410 as the mixture oxidizes and superheated steam is produced. The clean superheated steam travels inward and exits up steam delivery pipe 430 to the desired use.

The heavier oxidation byproducts and unboiled water are forced outward and downward by the centrifugal forces created by the circular motion of the cyclone, they continue downward in a decreasing radius spiral until exiting the cyclone 420 at the bottom exit 435 and entering the oxidation byproduct receiver 425.

The oxidation byproduct receiver 425 can be removable for cleaning. The cyclone 420 and receiver 425 also serve as an accumulator to prolong and soften the steam delivery impulse, as well as cleaning the steam of oxidation byproducts that are unwanted in some steam uses. The assembly 400 can be without the oxidation byproduct receiver to send the combustion byproducts out of the cyclone 420 bottom exit 435 for use in abrasive cutting, while sending the clean steam up steam delivery pipe 430 for other uses.

It is understood that the invention can be adapted to meet many applications without leaving the inventions disclosure area. While the invention has been particularly shown and described with respect to preferred embodiments, it will be readily understood that minor changes in the details of the invention may be made without departing from the spirit of the invention.

I claim:

1. A steam generator comprising:
    a steam separator chamber having an external wall and an internal wall that defines a steam heating chamber, said steam separator internal wall retains very high pressures of steam and said steam heating chamber receiving water from a first transfer pipe; said first transfer pipe being located proximate to the external wall of said steam separator chamber;
    a pressure chamber that surrounds the steam separator chamber, said pressure chamber receiving a water stream through a first inlet pipe that is in fluid communication with the first transfer pipe, said water stream in the pressure chamber absorbing heat from the external wall of the steam separator chamber before the water stream is input into the internal steam heating chamber of the steam separator chamber via said first transfer pipe;
    a metering assembly coupled to the first transfer pipe, said metering assembly placing one or more energetic fuel packets at a desired rate into the water stream flowing through a transfer tube which is connected to the first transfer pipe, said energetic fuel packets having an outer casing that encapsulates a mixture of Aluminum particles, said outer casing of the energetic fuel packets forming a thin film seal surrounding an exterior surface of the fuel packet and assisting with packet ignition, and said outer casing having a combustible plug for sealing the energetic fuel packet after loading of Aluminum particles in to an internal cavity of the energetic fuel packet;
    a source of high energy that initiates oxidation of the energetic fuel packets in the first transfer pipe by exposing the thin film of the outer casing of the energetic fuel packet to said energy source after the fuel packets flow into the steam heating chamber via the transfer tube, said oxidation resulting in combustion of the Aluminum particles in the energetic fuel packet over a predetermined burn time to facilitate production of thermal energy and the transfer of thermal energy to produce steam in the steam heating chamber; and,
    an inlet into the interior of the steam separator chamber coupled to said transfer tube, said water stream with the one or more energetic fuel packets entering the interior of the steam separator chamber via the first transfer pipe, said water stream receiving thermal energy as the energetic fuel packet oxidizes and steam is produced in the heating chamber of the steam separator chamber, said steam being ejected from a top outlet on the separator chamber.

2. The steam generator of claim 1 wherein the steam separator contains superheated steam.

3. The steam generator of claim 1 wherein the steam separator has a cyclonic helical internal vanes.

4. The steam generator of claim 1 wherein the steam separator has an internal ceramic liner.

5. The steam generator of claim 1 wherein said metering assembly includes a pressure balanced rotary metering hub.

6. The steam generator of claim 1 wherein the high energy source is a high energy light source.

7. The steam generator of claim 1 wherein the transfer tube has a reflective inner coating.

8. The steam generator of claim 1 wherein the energetic fuel packet contains nano-aluminum particles.

9. A method for generating steam comprising:
    providing a steam separator chamber having an external wall and an internal wall that defines a heating chamber, said steam separator chamber having said internal wall that retains very high pressures of steam and steam separator chamber having a first transfer pipe coupled thereto;
    providing a pressure chamber that surrounds the steam separator chamber;
    receiving a water stream at the pressure chamber from a first inlet pipe,
    locating said first transfer pipe contiguous with the external wall of the steam separator chamber, said water stream in the pressure chamber absorbs heat from the external wall of the steam separator chamber;
    transferring the water stream from the pressure chamber into the heating chamber of the steam separator chamber via the first transfer pipe;
    coupling a metering assembly to the first transfer pipe;
    providing one or more energetic fuel packets to the water stream in a transfer tube which is connected to the first transfer pipe via the metering assembly; said energetic fuel packet having an outer casing that encases and seals a mixture of Aluminum particles inside said energetic fuel packet, said energetic fuel packet having a combination plug to facilitate sealing the energetic fuel packet after loading of Aluminum particles into the internal portion of the energetic fuel packet;
    placing energetic fuel packets at a desired rate into a water stream using a metering assembly,
    injecting said water stream containing the energetic fuel packets into the steam separator chamber via said transfer tube;
    exposing the energetic fuel packets to a high energy source to initiate oxidation of the packets through the thin film outer casing that seals the energetic fuel packet;
    generating thermal energy as the energetic fuel packet oxidizes, said oxidation resulting in the combustion of the Aluminum particles in the energetic fuel packet over a predetermined burn time to facilitate production of thermal energy; and,
    producing steam in the steam separator chamber in response to the energetic fuel packet oxidation, said steam being ejected from a top outlet on the separator chamber.

10. The method of generating steam according to claim 9 wherein the steam separator contains superheated steam.

11. The method of generating steam according to claim 9 wherein the steam separator has a cyclonic helical internal vanes.

12. The method of generating steam according to claim 9 wherein the steam separator has an internal ceramic liner.

13. The method of generating steam according to claim 9 wherein said metering assembly includes a pressure balanced rotary metering hub.

14. The method of generating steam according to claim 9 wherein the high energy source is a high energy light source.

15. The method of claim 9 further comprising the steps of:
providing a pressure chamber that surrounds the steam separator chamber;
receiving at the pressure chamber said water stream through an inlet pipe, said water stream absorbing heat from the external wall of the steam separator chamber; and
transferring the water stream out of the pressure chamber via a transfer pipe to said metering assembly.

16. The method of generating steam according to claim 9 wherein the transfer tube has a reflective inner coating.

17. The method of generating steam according to claim 9 wherein the energetic fuel packet contains nano-aluminum particles.

18. A steam generator comprising:
a steam separator chamber having an external wall and an internal wall that defines a heating chamber, said steam separator chamber retains very high pressures of steam;
one or more water inlet pipes connected to the heating chamber of said steam separator chamber, said one or more water inlet pipes providing a water stream to the heating chamber of the steam separator chamber;
a canister meter assembly coupled to said one or more inlet pipes that is connected to the interior of the steam separator chamber, said canister meter assembly injecting one or more energetic fuel packets at a desired rate into the water stream that is provided to the heating chamber of the steam separator chamber, said energetic fuel packets having an outer casing that seals a mixture of Aluminum particles in a thin film, said outer casing of the energetic fuel packets forming said thin film to facilitate packet ignition through oxidation and combustion of said outer casing of the energetic fuel packet, said energetic fuel packet having a combustion plug for sealing the energetic fuel packet after Aluminum particles are loaded into the internal portion of the energetic fuel packet;
a source of high energy that initiates said oxidation of the energetic fuel packets through the outer casing of thin film, said oxidation occurring in the steam separator chamber after exposing the thin film of the outer casing of the energetic fuel packet to said high energy source resulting in oxidation and combustion of the Aluminum particles in the energetic fuel packet over a predetermined burn time so as to properly facilitate production of thermal energy at a predetermined rate based on the number of energetic fuel packets laced in the water stream by the canister meter and the thickness of the thin film formed by the outer casing of the energetic fuel packet;
said energetic fuel packet enters the interior of the steam separator chamber and generates thermal energy as the energetic fuel packet oxidizes and combusts, which produces steam that is ejected from a top outlet on the separator chamber.

19. The steam generator of claim 18 wherein the steam separator retains superheated steam.

20. The steam generator of claim 18 wherein the steam separator has a cyclonic helical internal vanes.

21. The steam generator of claim 18 wherein the steam separator has an internal ceramic liner.

22. The steam generator of claim 18 wherein the high energy source is a high energy light source.

23. The steam generator of claim 18 wherein the energetic fuel packet contains nano-aluminum particles.

\* \* \* \* \*